United States Patent
Hallock et al.

(10) Patent No.: US 8,681,586 B2
(45) Date of Patent: Mar. 25, 2014

(54) FREE CHARGE CARRIER DIFFUSION RESPONSE TRANSDUCER FOR SENSING GRADIENTS

(75) Inventors: Gary A. Hallock, Austin, TX (US); Mark A. Meier, Houston, TX (US)

(73) Assignee: ExxonMobil Upstream Research Company, Houston, TX (US)

( * ) Notice: Subject to any disclaimer, the term of this patent is extended or adjusted under 35 U.S.C. 154(b) by 392 days.

(21) Appl. No.: 13/122,839

(22) PCT Filed: Oct. 9, 2009

(86) PCT No.: PCT/US2009/060209
§ 371 (c)(1),
(2), (4) Date: Apr. 6, 2011

(87) PCT Pub. No.: WO2010/059304
PCT Pub. Date: May 27, 2010

(65) Prior Publication Data
US 2011/0194376 A1    Aug. 11, 2011

Related U.S. Application Data

(60) Provisional application No. 61/117,026, filed on Nov. 21, 2008.

(51) Int. Cl.
*G01V 1/18* (2006.01)
*G01H 9/00* (2006.01)

(52) U.S. Cl.
CPC . *G01V 1/189* (2013.01); *G01H 9/00* (2013.01)
USPC ........ 367/164; 73/861.08; 310/318; 310/317; 310/366; 367/156; 367/168; 367/15

(58) Field of Classification Search
CPC ....... G01V 1/181; G01V 1/186; G01V 1/189; G01H 9/00
USPC ................. 367/15, 156, 168, 164; 73/861.08; 310/318, 317, 366
See application file for complete search history.

(56) References Cited

U.S. PATENT DOCUMENTS 3,354,426 A    11/1967  Massa
3,447,117 A     5/1969  Duffield
(Continued)

FOREIGN PATENT DOCUMENTS

GB    2 198 851    6/1988

OTHER PUBLICATIONS

Chen, F.F. (1984), "Introduction to Plasma Physics and Controlled Fusion, Chapter 5, Diffusion and Resitivity" New York, Plenum Press, pp. 155-169.

(Continued)

*Primary Examiner* — Isam Alsomiri
*Assistant Examiner* — Hovhannes Baghdasaryan
(74) *Attorney, Agent, or Firm* — ExxonMobil Upstream Research Company Law Dept.

(57) ABSTRACT

Devices for sensing gradients are constructed from material whose properties change in response to gradients. One embodiment of the device is a transducer (200) for sensing gradients that includes the material (210) and two or more electrodes (240, 270) coupled to the material. In one embodiment, gradients in a surrounding medium (110) modify the energy gap of the material in the transducer (130) producing a diffusion current density (150). The material is configured to connect to a current or voltage measurement device (520, 530, 540) where a measurement is used to determine the gradient in the medium (160). The devices can be used to measure pressure, temperature, and/or other properties. The transducer can be built on the same substrate as complementary circuitry. A transducer made of Indium. Antimonide is used in marine seismology to measure pressure gradients.

23 Claims, 7 Drawing Sheets

(56) References Cited

U.S. PATENT DOCUMENTS

| | | | |
|---|---|---|---|
| 3,713,084 | A | 1/1973 | Mayne et al. |
| 3,715,713 | A | 2/1973 | Massa |
| 4,088,907 | A * | 5/1978 | Jones et al. .................. 310/333 |
| 4,208,737 | A | 6/1980 | Thompson et al. |
| 4,298,969 | A | 11/1981 | Rickenbacker |
| 4,387,450 | A | 6/1983 | Zachariadis |
| 4,799,752 | A | 1/1989 | Carome |
| 4,800,542 | A | 1/1989 | Franklin et al. |
| 4,827,459 | A | 5/1989 | Franklin |
| 5,051,961 | A | 9/1991 | Corrigan et al. |
| H1524 | H | 4/1996 | Thompson et al. |
| 6,580,661 | B1 | 6/2003 | Marschall et al. |
| 6,775,618 | B1 | 8/2004 | Robertsson et al. |
| 7,016,260 | B2 | 3/2006 | Bary |
| 7,239,577 | B2 | 7/2007 | Tenghamn et al. |
| 7,245,954 | B2 | 7/2007 | Glukhovsky |
| 7,295,494 | B2 | 11/2007 | Meier |
| 7,377,357 | B2 | 5/2008 | Duren et al. |
| 7,382,689 | B2 | 6/2008 | Maples et al. |
| 7,436,736 | B2 | 10/2008 | Schneider et al. |
| 2002/0062778 | A1 | 5/2002 | Barker |
| 2003/0117893 | A1 * | 6/2003 | Bary ............................. 367/16 |
| 2005/0194201 | A1 | 9/2005 | Tenghamn et al. |
| 2006/0092767 | A1 * | 5/2006 | Meier ........................... 367/149 |

OTHER PUBLICATIONS

Fastykovsky, P.P. (1998), "Accelerometer based on metal-silicon dislocation diode structures," *Sensors and Acutators* A67, pp. 65-67.

Poerschkte, R. et al. (1991), "Data in Science and Technology, Semiconductors Group IV Elements and III-V Compounds," Springer-Verlag, pp. 1-4, 141-150.

Singh, J. (2003), "Electronic and Optoelectronic Properties of Semiconductor Structures," Cambridge University Press, pp. 89, 517.

Smith, R.A. (1961), "Semiconductors," Cambridge University Press, pp. 78.

Van Camp, P.E. et al. (1990), "Pressure dependence of the electronic properties of cubic III-IV in Compounds," *Physical Review B*, pp. 1598-1602.

*International Search Report and Written Opinion*, dated Mar. 31, 2010, PCT/US2009/060209.

* cited by examiner

FREE CHARGE CARRIER DIFFUSION RESPONSE TRANSDUCER FOR SENSING GRADIENTS

CROSS REFERENCE TO RELATED APPLICATIONS

This application is the National Stage of International Application No. PCT/US2009/060209, that published as WO 2010/059304, filed 9 Oct. 2008, which claims the benefit of U.S. Provisional Application No. 61/117,026, filed 21 Nov. 2008, each of which is incorporated herein by reference, in its entirety, for all purposes.

TECHNICAL FIELD

This disclosure relates to a transducer for sensing gradients. More specifically, this disclosure relates to transducers for sensing pressure gradient and other gradients, such as may be used for collecting seismic data in marine settings.

BACKGROUND

Transducers have been used in a vast number of situations. Generally, a transducer is a device that converts one type of energy into another type of energy. Because direct measurement of a physical property can be difficult, a transducer is useful for converting measurement of a physical property that is difficult to measure to a physical property that is easier to measure.

One application for transducers is marine seismology. Marine seismology is the study of the subsurface of the Earth underneath bodies of water. Conventional measurements involve a device for wave generation at or near the surface that creates pressure waves aimed at the Earth's subsurface. The waves travel through the Earth's interior and the waves are both reflected and refracted as they progress through the subsurface. The pressure waves reflected from the subsurface are measured at a second device at or near the water's surface. The second device includes a transducer. Conventionally, the transducer is at least one hydrophone, and often more, that transduces the pressure waves into electrical signals. Some transducers available for measuring pressure waves include motion sensors that measure acoustic particle velocity or acceleration as a means for determining the pressure gradient associated with an acoustic wave. These sensors are disadvantageous because they measure any type of motion whether associated with an acoustic wave or another phenomenon. The other sources of motion add noise and error to the measurement obtained from the sensor.

The measurement process is complicated because the received signal is a combination of a reflected pressure wave from the air-water interface at the water surface and the reflected pressure wave from the subsurface of the Earth. Separating these signals can be accomplished if both the pressure and the pressure gradient are known for a given location. Conventional transducers such as hydrophones sense pressure. But sensors to sense pressure gradient are more difficult.

Transducers require a certain amount of time to respond to a physical property and generate an output. Transducers that respond very quickly are referred to as "fast response" transducers. Many hydrophones are fast response transducers in that they respond to pressure waves in an amount of time much shorter than the time of change in pressure caused by seismic waves. Therefore, hydrophones are often used to measure pressure changes over time at the location of the hydrophone. The hydrophone provides a measurement which is described to be a measurement of pressure as a function of time. The change in pressure with time may be referred to as a temporal derivative of pressure, or temporal gradient of pressure. However, the term "pressure gradient" as used herein is reserved exclusively to describe a change in pressure with a change in position. This usage is consistent with that used broadly in the art, in which case a hydrophone is a pressure sensor, and is not a pressure gradient sensor. A pressure gradient sensor provides a measurement of the change in pressure with position at the location of the sensor. Furthermore, a pressure gradient sensor may have fast response, in which case it provides a measurement of the change in pressure with position at the location of the sensor as a function of time.

Measuring gradients of a property are particularly challenging. One approach to measuring a gradient is to use multiple transducers to measure the desired property at multiple locations. The difference of the measurements made by the transducers may be divided by the distance between locations of the transducers. Assuming a constant gradient, this approach results in the rate of change of a property along the direction from one transducer to another transducer. Although simple, this approach has several problems. First, if the gradient varies between the location of two transducers (i.e., the first derivative is not constant), the measurement may not be sufficiently accurate. Second, difference measurements from two transducers can introduce problems including, but not limited to: relative position errors, common-mode rejection problems, and limitation of bandwidth and dynamic range compared to the individual transducer elements.

Other related material may be found in at least U.S. Pat. Nos. 7,239,577; 7,295,494; 7,245,954; 6,775,618; 3,715,713; U.S. Patent App. Pub. 20050194201; U.S. SIR Pub. No. H1524; and *Acoustic Particle Velocity Sensors: Design, Performance, and Applications*, Editors M. J. Berliner and J. F. Lindberg, AIP Conference Proceedings 368, September 1995, Woodbury, N.Y.: American Institute of Physics, 1996; Singh, Jasprit (2003) "Electronic and Optoelectronic Properties of Semiconductor Structures," New York: Cambridge University Press; Chen, F. F. (1984) "Introduction to Plasma Physics and Controlled Fusion," New York: Plenum Press; Smith, R. A., (1961) "Semiconductors," New York: Cambridge University Press; Van Camp, P. E., Van Doren, V. E., Devreese, J. T. (1990) "Pressure dependence of the electronic properties of cubic III-IV In compounds," *Physical Review B*, January 1990, pp. 1598-1602; and *Data in Science and Technology*, Editor in Chief: R. Poerschke, *Semiconductors, Group IV Elements and III-V Compounds*, edited by O. Madelung (Springer-Verlag, New York, 1991).

BRIEF SUMMARY

One or more embodiments of the present techniques are directed to apparatus, systems, and methods which provide one or more transducers for directly measuring gradients. A transducer according to one or more embodiments of the present techniques utilizes a material that responds to a gradient of a property in the medium surrounding the transducer. According to one embodiment, a transducer can be created where the output of the transducer is responsive, at least in part, to the gradient. According to a further embodiment, a transducer exploits the diffusion of free charge carriers in a material to measure the gradient of a property of the transducer's surrounding medium. A transducer according to embodiments of the present techniques is comprised substantially of a material with an "energy gap" (sometimes referred to as "forbidden energy gap," "electronic band gap," "energy band gap," "band gap" or "bandgap") sensitive to the physical property of which measurement is desired. According to embodiments of the invention, a single transducer is used to measure a gradient along at least one direction. According to other embodiments of the present techniques, several transducers are combined to measure gradients in multiple locations and/or multiple directions.

In one embodiment, semiconductor materials are used in the transducers. The energy gap of semiconductor materials used is dependent upon, for example, pressure. A gradient in the pressure creates a corresponding gradient in the energy gap. A gradient in the energy gap creates a gradient in free charge carriers, such as electrons and holes. A diffusion of electrons and holes from regions of higher number densities to regions of lower number densities occurs. If the diffusion rate of electrons and holes differs from one another, an electrical response, such as an electric current or potential is created. The electrical response is measured and used to determine the gradient of the surrounding medium's pressure. In one embodiment, current (e.g., the diffusion current) through the material is correlated with the pressure gradient in the surrounding medium. In another embodiment, voltage across the material is correlated with the pressure gradient in the surrounding medium.

Several properties affect the energy gap in semiconductors and other materials. Accordingly, in yet another embodiment, measured voltage across or current through the transducer is correlated with temperature gradients in the surrounding medium. Similar to pressure, temperature and/or other like properties can be measured by a transducer of embodiments herein.

The advantages to a single transducer capable of measuring gradients are numerous. Measurement using two conventional transducers complicates device construction and analysis of the obtained measurements. When two or more conventional sensors are used in a differential measurement, common mode rejection problems arise. Additionally, manufacturing variations from one sensor to another sensor can distort measurements when compared. Single transducers as disclosed herein are capable of measuring local gradients and eliminates problems associated with conventional differential sensor measurements. A spatially dependent gradient in the measured property has a direct effect on the transducer's energy gap and resulting measurement, while differential measurements using two unique sensors requires the assumption of a constant gradient.

Moreover, the compact size and configurations of transducers disclosed herein facilitate transducer configurations heretofore not available. For example, an arrangement of multiple transducers can be provided that allow, for example, measurement of a gradient in a single direction at multiple locations, multiple directions at a single location, or multiple directions at multiple locations. According to one embodiment of the present techniques, additional electrodes may be added to a single transducer allowing measurement of gradients in multiple directions. According to another embodiment of the present techniques, at least two transducers can be placed in different alignments to allow measurement of the gradient along multiple directions. According to yet another embodiment of the invention, at least two transducers can be placed in substantially the same direction such that the gradient can be measured in multiple locations to obtain a gradient of the gradient. Additionally or alternatively, embodiments of the present techniques may dispose additional circuitry, such as amplifiers, processors, filters, etc., on a same integrated circuit substrate used to provide a gradient transducer.

The foregoing has outlined rather broadly the features and technical advantages of the present techniques in order that the detailed description that follows may be better understood. Additional features and advantages will be described hereinafter which form the subject of the claims of the invention. It should be appreciated by those skilled in the art that the conception and specific embodiments disclosed may be readily utilized as a basis for modifying or designing other structures for carrying out the same purposes of the present invention. It should also be realized by those skilled in the art that such equivalent constructions do not depart from the technology of the invention as set forth in the appended claims. The novel features which are believed to be characteristic of the present techniques, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present techniques.

BRIEF DESCRIPTION OF THE DRAWINGS

For a more complete understanding of the present application, reference is now made to the following descriptions taken in conjunction with the accompanying drawings, in which.

DETAILED DESCRIPTION

Figure 1:
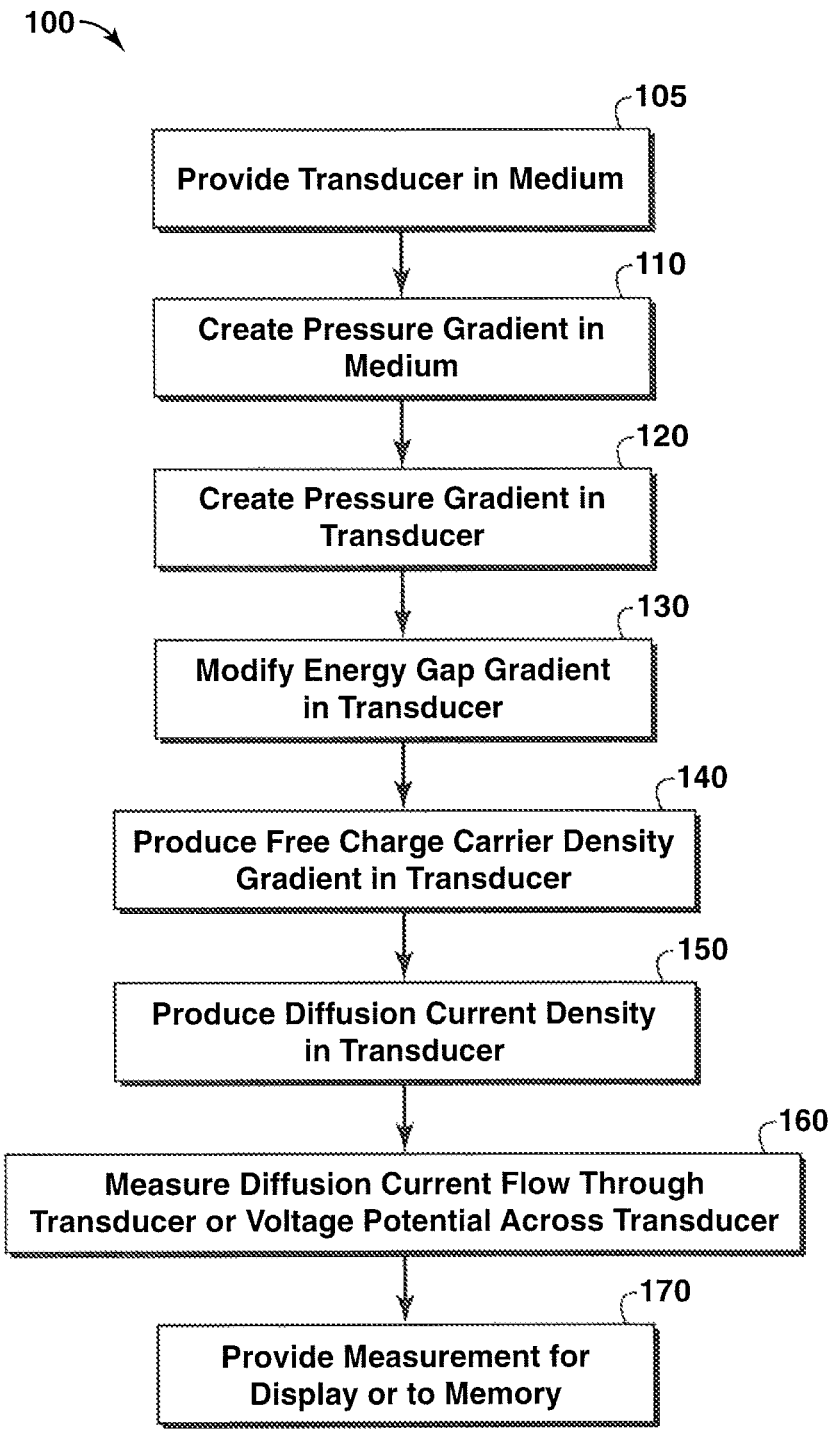
FIG. 1 is a flow chart illustrating transduction of a pressure gradient in a medium to a measurable property in a material according to an embodiment of the present techniques.

At the outset, and for ease of reference, certain terms used in the detailed description of the present invention and their meanings as used in this context are set forth. To the extent a term used in a claim is not defined below, it should be given the broadest definition persons in the pertinent art have given that term as reflected in at least one printed publication or issued patent.

As used herein, "gradient" is the rate of change of a property, such as pressure and temperature, with change in position.

As used herein, "hydrophone" is a pressure transducer for detecting temporal variation in pressure in water surrounding the transducer.

As used herein, an "energy gap", also called a "band gap", is an energy range in a solid where no electron states exist. For semiconductors, the energy gap refers to the energy difference between the top of the valence band and the bottom of the conduction band; electrons are able to jump from one band to another. In order for an electron to jump from a valence band to a conduction band, it requires a specific amount of energy for the transition. The required energy differs with different materials.

As used herein, a "physical property" of a medium includes pressure, temperature, strain parameters, magnetic flux density, and any other measurable attribute of the medium.

As used herein, "medium" is meant to include sea water, river water, lake water, swampwater, mud, ocean bottom mud, viscous fluid, gas, solid, and any other substance displaceable by the transducer disclosed herein which enables the transducer to measure a gradient therein.

As used herein, "couple", "coupling," and "coupled" means and refers to attaching, securing, mating, and/or the like.

As used herein, "free charge carrier" is a free (mobile, unbound) particle carrying an electric charge, for example, an electron or a hole.

As used herein, a "hole" refers to the absence of a valence electron in a semiconductor crystal.

As used herein, a "semiconductor" is a material that is neither an insulator nor a full conductor that has an intermediate level of electrical conductivity and in which conduction takes place by means of holes and electrons.

As used herein, a "doped semiconductor" is a semiconductor into which a doping agent has been introduced, giving it different electrical properties than the intrinsic (pure) semiconductor. Doping involves adding dopant atoms to an intrinsic semiconductor, which changes the electron and hole carrier concentrations of the semiconductor at thermal equilibrium.

As used herein, an "intrinsic semiconductor", also called an undoped semiconductor, is a pure semiconductor without any significant dopant species present. The number of free charge carriers is therefore determined by the properties of the material itself instead of the amount of impurities.

As used here, "free charge carrier density" denotes the number of free charge carriers per unit volume.

As used herein, "diffusion current" denotes motion of free charge carriers in a semiconductor by diffusion, that is, from the region of high carrier concentration to the region of low carrier concentration.

All patents, test procedures, and other documents cited in this application are fully incorporated by reference to the extent such disclosure is not inconsistent with this application and for all jurisdictions in which such incorporation is permitted.

In the following detailed description section, the specific embodiments of the present invention are described in connection with preferred embodiments. However, to the extent that the following description is specific to a particular embodiment or a particular use of the present invention, this is intended to be for exemplary purposes only and simply provides a description of the exemplary embodiments. Accordingly, the invention is not limited to the specific embodiments described below, but rather, it includes all alternatives, modifications, and equivalents falling within the true spirit and scope of the appended claims.

As disclosed in this application, a transducer adapted according to embodiments disclosed herein is capable of directly sensing gradients of properties of a medium surrounding the transducer. For example, a gradient transducer has a body which contains a material where at least one property of the material is responsive to gradients in a medium surrounding the body. Accordingly, a gradient transducer body comprised of such a material may be provided such that the transducer's output is directly responsive to gradients in the surrounding medium.

A single transducer directly sensitive to the local gradient of a property can have many advantages, particularly for measuring pressure gradient or temperature gradient. One example is the Diamagnetic Current Response Transducer, U.S. Pat. No. 7,295,494. The transducer responds to a pressure gradient in a surrounding fluid medium. However, the device requires the application of a strong magnetic flux density and a material consisting of free charge carriers with high mobility such that the product of magnetic flux density and mobility is greater than one. The present invention does not require application of a strong magnetic flux density, but relies on inherent behavior of certain materials to sense a property gradient without application of external fields. The materials preferably possess a large difference in mobilities of free charge carriers of opposite electrical charge.

Other methods of measuring the gradient of properties such as pressure and temperature exist. Each achieves measurement objectives with varying degrees of success. For example, the problem of measuring the pressure gradient associated with acoustic waves in a fluid medium has been approached in many ways. See for example "*Acoustic Particle Velocity Sensors: Design, Performance, and Applications*", Editors M. J. Berliner and J. F. Lindberg, AIP Conference Proceedings 368, September 1995, Woodbury, N.Y.: American Institute of Physics, 1996. Several of these approaches involve measuring acoustic particle velocity or acceleration as a proxy. However, many problems are associated with the use of motion sensors (displacement, velocity, acceleration), as discussed above.

Transducer bodies comprised of one or more materials making use of free charge carrier diffusion as taught herein are one example for use in measuring gradients with a single transducer. Materials for such transducer bodies are chosen such that the property desired to be measured spatially modifies the energy gap of the material. Examples can be found in the literature; for example, energy gap dependence on temperature for several semiconductors is given by Singh and Jasprit (2003) "Electronic and Optoelectronic Properties of Semiconductor Structures," New York: Cambridge University Press, Table D.1, page 517 and Van Camp, P. E., Van Doren, V. E., Devreese, J. T., "Pressure dependence of the electronic properties of cubic III-IV In Compounds", *Physical Review B*, January 1990, pp. 1598-1602, gives energy gap dependence on pressure for several semiconductors. *Semiconductors, Group IV Elements and III-V Compounds*, edited by O. Madelung (Springer-Verlag, New York, 1991) gives energy gap and other electronic properties for many Group IV elements and Group III-V compounds of the Periodic Table.

Additionally, materials are chosen in which free electron and hole mobilities are substantially different. As will be shown, a large difference in mobilities allows for a greater electrical response. One or more embodiments provide for measurement of gradients, such as pressure, temperature, and/or the like. Embodiments discussed below provide for the measurement of pressure gradients. However, it should be appreciated that the present teachings can be applied to embodiments measuring a variety of gradients.

FIG. 1 is an exemplary flow chart 100 illustrating transduction from a pressure gradient in a medium to a measurable electrical property in a material according to an embodiment of the present techniques. One advantageous application of a transducer for measuring pressure gradients is in marine seismology. At block 105, a transducer is provided in a medium. At a block 110, a reflected wave creates a pressure gradient in the medium surrounding a transducer. This pressure gradient may directly interact with the transducer or may be mechanically coupled to the transducer. At a block 120, the pressure gradient in the medium creates a pressure gradient in the material of the transducer. At a block 130, the pressure gradient in the material spatially modifies the energy gap of the material in the transducer. At a block 140, the change in energy gap results in a gradient of free charge carrier densities in the transducer. At a block 150, the gradient of free charge carrier densities creates a diffusion current density in the transducer. At a block 160, the diffusion current density is measured. This may be measured as current flow through the transducer or as voltage potential across the transducer. The transduction is further explained below.

For illustrative purposes, relationships are derived and correlated to events in FIG. 1 for one possible example where the property desired to be measured is gradients of pressure. In marine seismology, a transducer, as described in one embodiment, can be placed in a body of water (the medium). A spatial variation in pressure causes spatial variation in the energy gap of the material as in block 130. The modified energy gap causes a spatial gradient in free electron and hole, the charge carriers, densities as in block 140 resulting in a particle flux given by the equation (1), which is as follows:

$$\vec{\Gamma}_s = -D_s \nabla n_s, \quad (1)$$

where $\vec{\Gamma}_s$ is the particle flux, $D_s$ is the coefficient of diffusion, and $n_s$ is the density; the subscript "s" denoting a particular free charge carrier species, such as electrons or holes. The diffusion current density represented as block 150 is a product of fundamental charge and the particle flux given by the equations (2) and (3), which are as follows:

$$\vec{J}_e = -e\vec{\Gamma}_e = eD_e \nabla n_e, \quad (2)$$

where the subscript "e" refers to electrons, and $$\vec{J}_h = e\vec{\Gamma}_h = -eD_h \nabla n_h, \quad (3)$$

where the subscript "h" refers to holes, where $\vec{J}_e$ is the electron diffusion current density and $\vec{J}_h$ is the hole diffusion current density, and e is the fundamental charge. The total diffusion current density is the sum of the electron and hole diffusion current densities, $$\vec{J}_D = \vec{J}_e + \vec{J}_h = e(D_e \nabla n_e - D_h \nabla n_h). \quad (3.5)$$

The diffusion current as in block 160 is, therefore, a product of total diffusion current density and the cross-sectional area through which current flows given by equation (4), which is as follows:

$$i_D = \vec{J}_D \cdot \vec{A} = e|D_e \nabla n_e - D_h \nabla n_h| A \cos \theta, \quad (4)$$

where $\vec{A}$ is a vector with magnitude equal to the cross-sectional area through which current flows and a direction normal to the surface of the cross-sectional area through which current flows, θ is the angle between the direction of the normal to the surface and the direction of total diffusion current density, and the total diffusion current density is approximately constant over the cross-sectional area. Provided $D_e \nabla n_e \neq D_h \nabla n_h$, a diffusion current density and diffusion current exist. Using Einstein's relation, a substitution is made to obtain the total diffusion current density given by:

$$\vec{J}_D = k_B T(\mu_e \nabla n_e - \mu_h \nabla n_h), \quad (4.5)$$

and diffusion current given by $$i_D = k_B T|\mu_e \nabla n_e - \mu_h \nabla n_h| A \cos \theta, \quad (5)$$

where $k_B$ is Boltzmann's constant, T is the temperature, $\mu_e$ is the electron mobility, and $\mu_h$ is the hole mobility. In this form, it is shown that a total diffusion current density and diffusion current exist provided $\mu_e \nabla n_e \neq \mu_h \nabla n_h$.

Two types of semiconductors available are intrinsic semiconductors and doped semiconductors. In one embodiment an intrinsic semiconductor is used. In intrinsic semiconductors the electron and hole number densities are equal, as given by $$n_e = n_h = n_i \quad (5.5)$$

and the electron and hole number density gradients are equal, as given by the equation (6), which is as follows:

$$\nabla n_e = \nabla n_h = \nabla n_i. \quad (6)$$

In another embodiment, a doped semiconductor is used. Doping changes the relation between free charge carrier densities as given by $$n_e + n_d + N_a = n_h + N_d + n_a, \quad (6.5)$$

and equation (7), which is as follows:

$$\nabla n_e + \nabla n_d + \nabla N_a = \nabla n_h + \nabla N_d + \nabla n_a, \quad (7)$$

where $N_a$ is the acceptor number density, $N_d$ is the donor number density, $n_d$ is the number density of un-ionized donors, and $n_a$ is the number density of un-ionized acceptors. Doping the semiconductor results in changes in the number densities in the material. Changes in the energy gap from pressure gradients affects doped semiconductors as well as intrinsic semiconductors. The combined effect results in a fixed change of the free charge carrier densities as a result of the doping and a modulating of the free charge carrier densities as a result of the pressure changes in the surrounding medium. One skilled in the art will recognize that the fixed effect of the doping can be factored out through calculations and compensated for in equation (5) given above.

A doped semiconductor with uniform distributions of impurities may also be considered. Then the gradients due to impurities are zero, $$\nabla n_d = \nabla N_a = \nabla N_d = \nabla n_a = 0$$

In this case, the electron and hole number densities are affected and generally unequal, $n_e \neq n_h$, but the electron and hole number density gradients equate, $\nabla n_e = \nabla n_h$.

Equation (5) shown above defines a measurable property, current, in terms of free charge carrier density gradients. The free charge carrier density gradients are a function of a physical property that spatially varies in response to the pressure gradient in the surrounding medium. Equations (3.5) to (6) can be combined to obtain simplified expressions for the diffusion current density and diffusion current in intrinsic semiconductors;

$$\vec{J}_D = e(D_e - D_h)\nabla n_i, \quad (7.1)$$

$$i_D = e(D_e - D_h)|\nabla n_i| A \cos\theta, \quad (7.2)$$

$$\vec{J}_D = k_B T(\mu_e - \mu_h)\nabla n_i \quad (7.3)$$

$$i_D = k_B T(\mu_e - \mu_h)|\nabla n_i| A \cos\theta. \quad (7.4)$$

Provided $D_e \neq D_h$ or, correspondingly, $\mu_e \neq \mu_h$, a diffusion current density and diffusion current can exist. An intrinsic semiconductor with a larger difference in electron and hole mobilities will create a larger diffusion current for a given free charge carrier density gradient.

One class of materials exhibiting the condition of having a free charge carrier density gradient in response to a pressure gradient in the surrounding medium are intrinsic semiconductors. The free charge carrier density in intrinsic semiconductors is governed by the equation (8), which is as follows:

$$n_i = 2\left[\frac{2\pi k_B T}{h^2}\right]^{3/2}(m_e m_h)^{3/4}\exp\left[\frac{-E_g}{2k_B T}\right], \quad (8)$$

where h is Planck's constant, $m_e$ and $m_h$ are the electron and hole effective masses, respectively, and $E_g$ is the energy gap. (See for example Singh, Jasprit (2003) "Electronic and Optoelectronic Properties of Semiconductor Structures," New York: Cambridge University Press, page 89; and Smith, R. A., (1961) "Semiconductors," New York: Cambridge University Press, page 78). For the isothermal case, the gradient in intrinsic free charge carrier density relates to the gradient in the energy gap by the equation (9), which is as follows:

$$\nabla n_i - n_i\left[\frac{-1}{2k_B T}\right]\nabla E_g \quad (9)$$

One intrinsic semiconductor available is Indium Antimonide (InSb). The energy gap in intrinsic Indium Antimonide is given by Van Camp, P. E., Van Doren, V. E., Devreese, J. T. (1990) "Pressure Dependence of the Electronic Properties of Cubic III-IV In Compounds," *Physical Review B*, January 1990, pp. 1598-1602, as $$E_g = E_g(0) + 2.190 \times 10^{-29} p - 5.824 \times 10^{-40} p^2, \quad (9.5)$$

where p is the pressure. Assuming a gradient in one dimension so that $\nabla = d/dx$, the gradient of the energy gap is given by equation (10), which is as follows:

$$\frac{dE_g}{dx} = 2.190 \times 10^{-29}\frac{dp}{dx} - 5.824 \times 10^{-40} * 2p\frac{dp}{dx}, \quad (10)$$

Constants here (and subsequently) are consistent with the MKS system of units (meter-kilogram-second system of units). Provided $p \ll 1.88 \times 10^{10}$ pascal, the second term on the right hand side of equation (10) may be negligible (is equivalent to zero). The free charge carrier density gradient in one dimension is given by the equation (11), which is as follows:

$$\frac{dn_i}{dx} = n_i\left[\frac{-1}{2k_B T}\right] * 2.190 \times 10^{-29}\frac{dp}{dx}, \quad (11)$$

where $n_i$ is both the electron density, $n_e$, and the hole density, $n_h$. At room temperature of 300 kelvin, InSb has an intrinsic number density of $2.05 \times 10^{22}$ per cubic meter, and electron and hole mobilities of 8.00 meter-squared per volt per second and 0.125 meter-squared per volt per second, respectively. Then, the diffusion current density is given by the equation (12), which is as follows:

$$J_{D,x} = k_B T(\mu_e - \mu_h)\frac{dn_i}{dx} = -1.77 \times 10^{-6}\frac{dp}{dx}. \quad (12)$$

An equation analogous to equation (5) may be determined for the case of Indium Antimonide assuming the sensor to be 1 cm×1 cm×1 cm in size and is given by the equation (13), which is as follows:

$$i_D = -1.77 \times 10^{-10}\frac{dp}{dx}. \quad (13)$$

For example, a pressure gradient of 1 pascal per meter produces a diffusion current of $-1.77 \times 10^{-10}$ amperes.

The preceding paragraph describes Indium Antimonide as transducer material for a pressure gradient transducer. Indium Antimonide is a useful pressure gradient transducer material because the energy gap depends on pressure and because the difference in electron and hole mobilities is large; that is 7.875 meter-squared per volt per second at 300 kelvin. Many materials have large differences in mobilities ranging from 0.1 to 10 meter-squared per volt per second. Materials with differences in mobilities less than 0.1 may provide a much weaker electrical response. Material with differences in mobilities greater than 10 may provide a much stronger response, but materials with differences in mobilities greater than 10 at 300 kelvin (room temperature) are not readily available. However, cooling, or super-cooling some materials substantially increases the difference in mobilities. Operation at temperatures other than 300 kelvin (room temperature) may be used to provide an amplified electrical response.

Although, transducing pressure gradients into measurable electrical properties has been disclosed in the preceding paragraphs, any property that modifies the energy gap of the material chosen for sensing can be transduced in a substantially similar manner. A partial list of these properties includes, for example, pressure, temperature, and strain.

Figure 2:
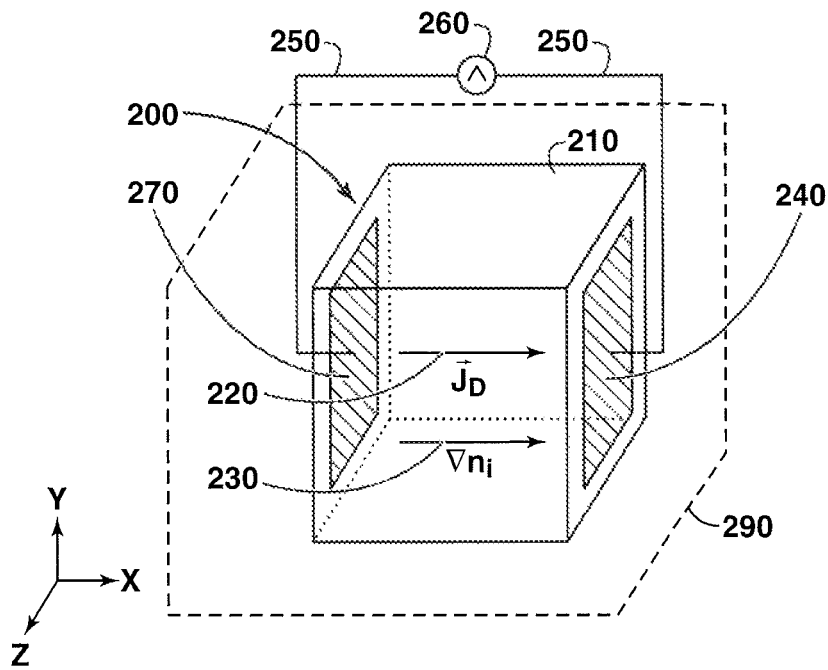
FIG. 2 is a diagram illustrating short circuit operation of a transducer according to an embodiment of the present techniques.

FIG. 2 is a diagram illustrating short circuit operation of a gradient transducer 200 of an embodiment of the present techniques. Short circuit operation of the transducer 200 is one embodiment for measuring the pressure gradient with a single transducer through the parameter $i_D$ as given above in equation (5). A gradient transducer 200 includes a transducer housing or transducer body 290. As depicted the transducer housing enclose a material 210 and electrodes 240 and 270, but provide electrical connectivity to a current measuring device 260. Alternatively, the transducer housing may enclose the material 210, electrodes 240 and 270, and current measuring device 260, or may be any configuration of a suitable packaging for the components of the transducer 200. The shape and size of the material 210 can be chosen to meet specific design requirements and one skilled in the art would be able to adapt the relationships established earlier to other shapes and sizes. In this embodiment, the material 210 is a cube with side lengths of 1 cm. The material 210 is made of one or more materials (nonlimiting example being semiconductors such as Indium Antimonide) which exhibit the properties for a diffusion current density, $J_D$, 220 to form as a result of a free charge carrier density gradient 230 in response to a pressure gradient in the surrounding medium. An electrode 240 and an electrode 270 composed of conducting material are coupled to the material 210 to capture the diffusion current density 220. The electrode 240 and the electrode 270 shown here are square in shape and on opposing sides of the transducer; however, any shape or size can function in a similar manner. A conductor 250 is coupled on both ends to the electrode 240 and the electrode 270. Also coupled to the conductor 250 is a current measuring device 260. The current measuring device 260 may be an ammeter or other device or integrated circuit capable of measuring current or other similar measuring device. The transducer housing 290 may be a waterproof package and/or electrically insulating package to protect the transducer material and accompanying other devices from damaging environmental conditions.

One advantage of the embodiment of the present techniques is that the transducer 200 responds passively to a gradient in the medium without any application of external fields. As a result, the transducer embodiment above is easier to design, operate, and manufacture than a similar design that uses an applied electric or magnetic field to induce change in the transducer in response to a gradient in the medium.

The transducer may be coupled to additional devices to create a system for measuring, storing, interpreting, and displaying the data collected from the transducer. For example, a memory device may be coupled to the measurement device to buffer or store measurement values obtained from the transducer according to embodiments. Furthermore, a processor may be coupled to the transducer and memory to control the measurement process and analyze the data collected according to embodiments. The processor, which may be a microprocessor, may calculate pressure gradients from the measured values through an algorithm, a lookup table, or other means known to one skilled in the art. Additionally, a display may be attached to the system to allow readout of the data collected from the transducer and other analysis performed by the processor according to embodiments.

In another embodiment, a transducer uses a different electrical parameter, the potential difference (or voltage), V. In the embodiment, high impedance between the two electrodes of the transducer obstructs electrical current. An electric field results from the diffusion current density balanced by an ohmic current density, the latter given by the equation (14), which is as follows:

$$\vec{J}_\sigma = \sigma \vec{E} = e n_e \mu_e \vec{E} + e n_h \mu_h \vec{E}, \quad (14)$$

where $\vec{E}$ is the electric field. Because of the high impedance, the diffusion and ohmic current densities must sum to zero, $\vec{J}_D + \vec{J}_\sigma = 0$. The solution for the electric field is given by the equation (15), which is as follows:

$$\vec{E} = \frac{k_B T}{e} \left( \frac{\mu_h \nabla n_h - \mu_e \nabla n_e}{\mu_h n_h + \mu_e n_e} \right). \quad (15)$$

The potential difference between the two electrodes is then given by the equation (16), which is as follows:

$$V = \int_{x_1}^{x_2} \vec{E} \cdot d\vec{l}, \quad (16)$$

where V is the voltage between the electrodes, and $d\vec{l}$ is a vector with differential length magnitude and pointing tangentially along a path between both electrodes. Evaluating the integral using the equation for $\vec{E}$ obtained previously in equation (15) results in a voltage given by the equation (17), which is as follows:

$$V = \frac{k_B T}{e} \left( \frac{|\mu_h \nabla n_h - \mu_e \nabla n_e|}{\mu_h n_h + \mu_e n_e} \right) * d \cos\theta, \quad (17)$$

where d is the distance between two electrodes and θ is the angle between the direction of the electric field, $\vec{E}$, and a straight line connecting the two electrodes.

In one embodiment an intrinsic semiconductor is used. Equations (5.5) and (6) can be used to simplify expressions for the electric field and voltage for an intrinsic semiconductor, $$\vec{E} = \frac{k_B T}{e} \left( \frac{\mu_h - \mu_e}{\mu_h + \mu_e} \right) \frac{\nabla n_i}{n_i}, \quad (17.1)$$

$$V = \frac{k_B T}{e} \left( \frac{\mu_h - \mu_e}{\mu_h + \mu_e} \right) \frac{|\nabla n_i|}{n_i} d \cos\theta. \quad (17.2)$$

Provided $\mu_e \neq \mu_h$, an electric field and voltage can exist. An intrinsic semiconductor with a larger difference in electron and hole mobilities will create a larger voltage for a given free charge carrier density and gradient. It is also beneficial if the smaller of the two mobilities is as close to zero as possible, thereby minimizing the sum of mobilities in the denominator.

Similar to the short circuit example, the open circuit example is calculated for the case where the material is Indium Antimonide and is given by the equation (18), which is as follows:

$$E_x = 6.62 \times 10^{-11} \frac{dp}{dx}. \quad (18)$$

An equation for voltage can be determined for the case of Indium Antimonide assuming the sensor to be 1 cm×1 cm×1 cm in size and is given by the equation (19), which is as follows:

$$V = d * E_x = 6.62 \times 10^{-13} \frac{dp}{dx}. \quad (19)$$

For example, a pressure gradient of 1 pascal per meter produces a voltage of $6.62 \times 10^{-13}$ volts. Equations (18) and (19) are the open circuit analogs to the short circuit solutions given in equations (12) and (13).

Figure 3:
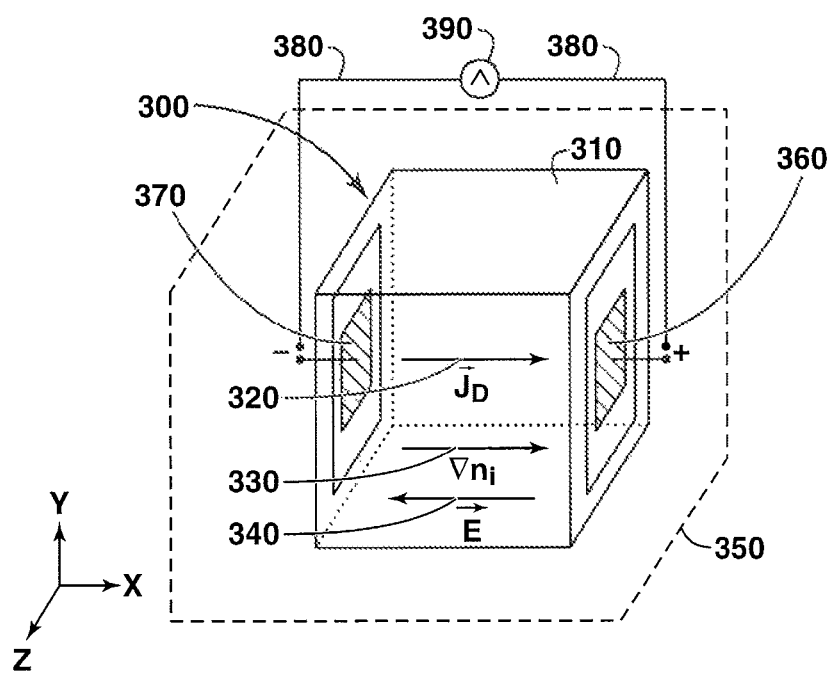
FIG. 3 is a diagram illustrating open circuit operation of a transducer according to an embodiment of the present techniques.

FIG. 3 is a diagram illustrating open circuit operation of a gradient transducer of an embodiment of the present techniques. Open circuit operation is one embodiment of a transducer that may be used in a sensor for measuring the pressure gradient with a single transducer through the parameter V as given above in equation (19). A gradient transducer 300 includes a transducer material 310. The transducer material 310 may be one or more materials (e.g., semiconductors, such as Indium Antimonide) which exhibit the properties necessary for a diffusion current density, $J_D$, 320 to form as a result of a free charge carrier density gradient 330 in response to a pressure gradient in the surrounding medium. An electrode 360 and an electrode 370 composed of conducting material are coupled to the transducer material 310. A high impedance connection 380 is coupled on both ends to the electrode 360 and the electrode 370. The high impedance connection 380 forces an electric field 340 to form resulting in a potential difference between the electrode 360 and the electrode 370 that can be measured by a voltage measurement device 390 coupled to the high impedance connection 380. The voltage measuring device 390 may be a voltmeter or other device or integrated circuit capable of measuring voltage. The transducer and accompanying devices may be packaged in a waterproof and electrically insulating package or housing 350 to protect the transducer 300 and accompanying devices from damaging environmental conditions, similar to the discussion above regarding the transducer housing 290.

Either the short circuit operation as described in FIG. 2 or the open circuit operation as described in FIG. 3 may be used depending on device impedance and circuit noise characteristics. The configurations shown as short circuit operation in FIG. 2 and open circuit operation in FIG. 3 are not intended to be exclusive configurations. One skilled in the art will recognize that additional configurations exist that measure gradients in accordance with the present techniques. For example, a matched impedance configuration could be derived from known circuit design methods.

Figure 4:
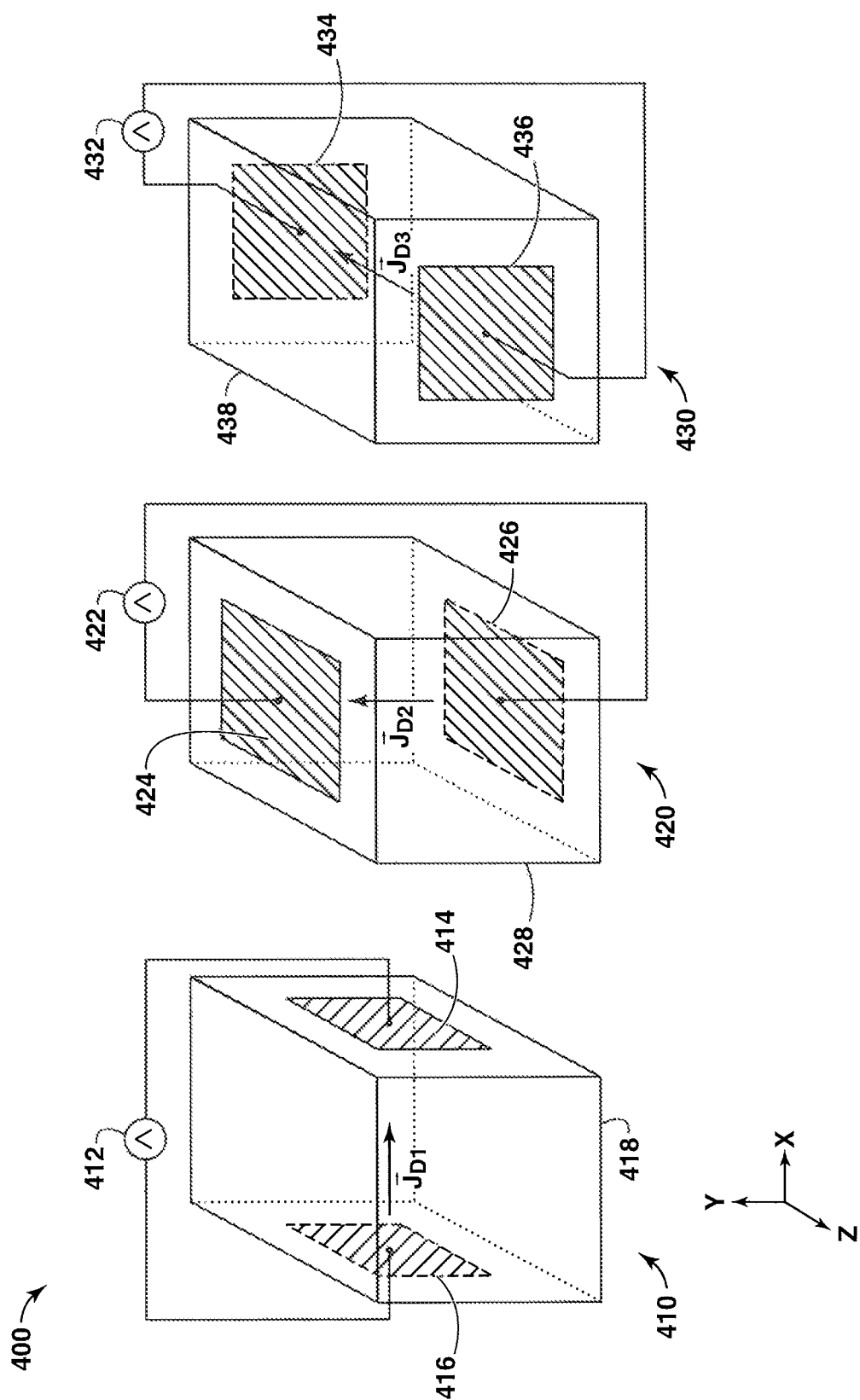
FIG. 4 is a diagram illustrating transducers configured to measure three mutually orthogonal pressure gradients according to an embodiment of the present techniques.

FIG. 4 is a diagram illustrating transducers configured to measure three mutually orthogonal pressure gradients. Configurations of multiple gradient transducers may be used advantageously in ocean bottom and streamer marine seismic applications. For example, such arrangements or configurations may be incorporated into two-component (2C) or four-component (4C) ocean bottom marine seismic applications to complement or replace conventional sensor measurements. Multiple transducer configurations may also be used to enable 2C capability in towed streamer marine seismic applications. As an example configuration, an arrangement 400 of transducers includes gradient transducers 410, 420 and 430. The gradient transducer 410 includes a measuring device 412 coupled to a material 418 via electrodes 414 and 416 for measuring either $i_D$ or V in a first direction. The gradient transducer 420, which is aligned orthogonal to the transducer 410, includes a measuring device 422 coupled to a material 428 via electrodes 424 and 426 for measuring either $i_D$ or V in a second direction. The gradient transducer 430, which is aligned orthogonal to the transducer 410 and the transducer 420, includes a measuring device 432 coupled to a material 438 via electrodes 434 and 436 for measuring either $i_D$ or V in a third direction. The transducer materials 418, 428 and 438 may be the same material or different materials.

An alternative to the arrangement 400 can include a single measuring device for the transducer 410, the transducer 420, and the transducer 430. For example, a switch could be used to couple the transducers to a single measuring device. The transducer 410, the transducer 420, and the transducer 430 may be gradient transducers as disclosed in embodiments of the present techniques or alternative configurations.

Figure 5:
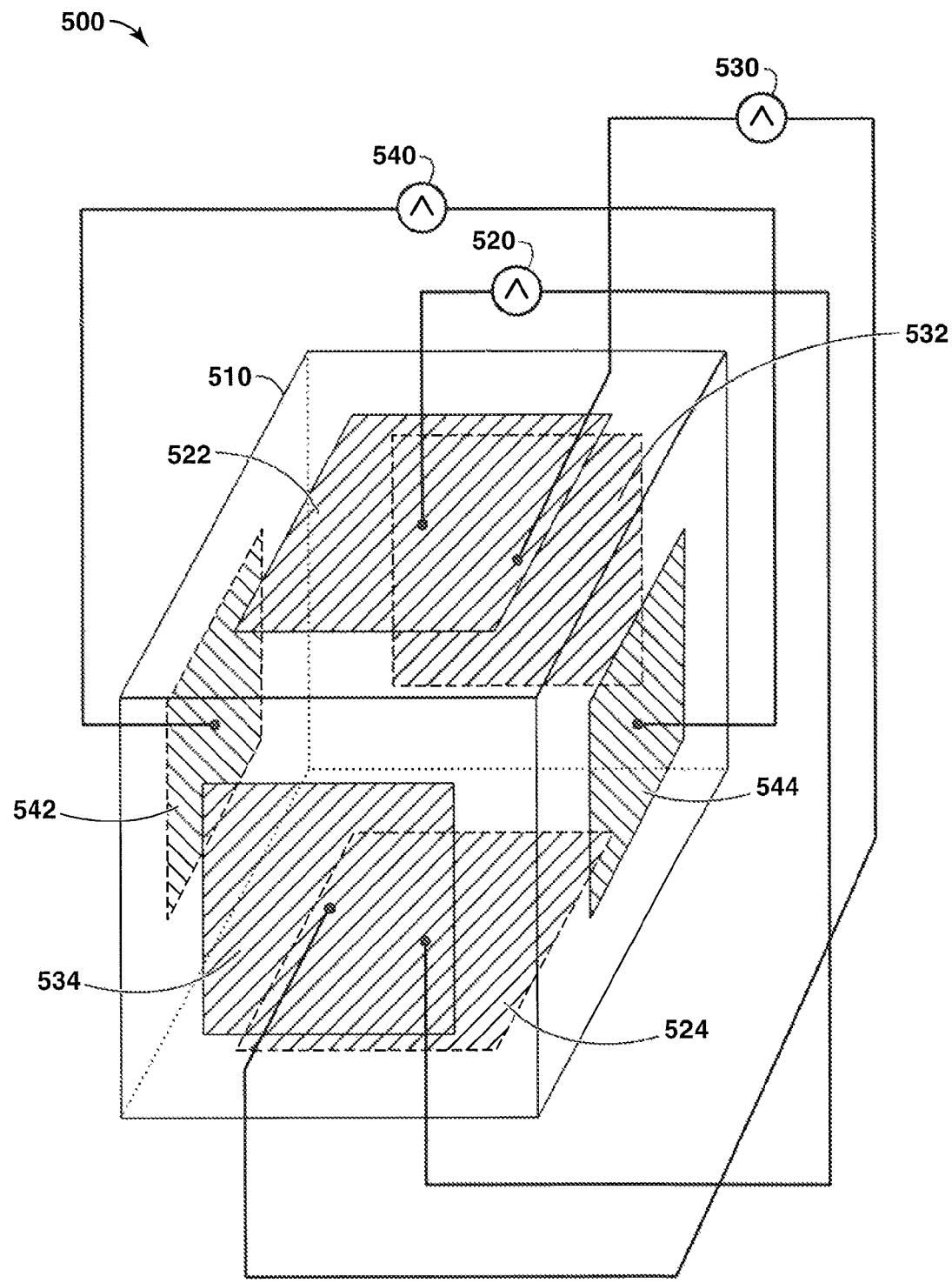
FIG. 5 is a diagram illustrating a transducer configured to measure pressure gradients in three mutually orthogonal directions according to an embodiment of the present techniques.

FIG. 5 is a diagram illustrating a transducer configured to measure three mutually orthogonal pressure gradients. A gradient transducer 500 includes a transducer material 510. Coupled to the transducer material 510 are three sets of electrodes 522, 524, 532, 534, 542 and 544. The electrodes 522 and 524 are coupled to a measuring device 520 for measuring either $i_D$ or V of the material 510 along a first direction. The electrodes 532 and 534 are coupled to a measuring device 530 for measuring either $i_D$ or V of the material 510 along a second direction. The electrodes 542 and 544 are coupled to a measuring device 540 for measuring either $i_D$ or V of the material 510 along a third direction. The electrodes are composed of an electrically conducting material (e.g., copper) and may be any size or shape.

Figure 6:
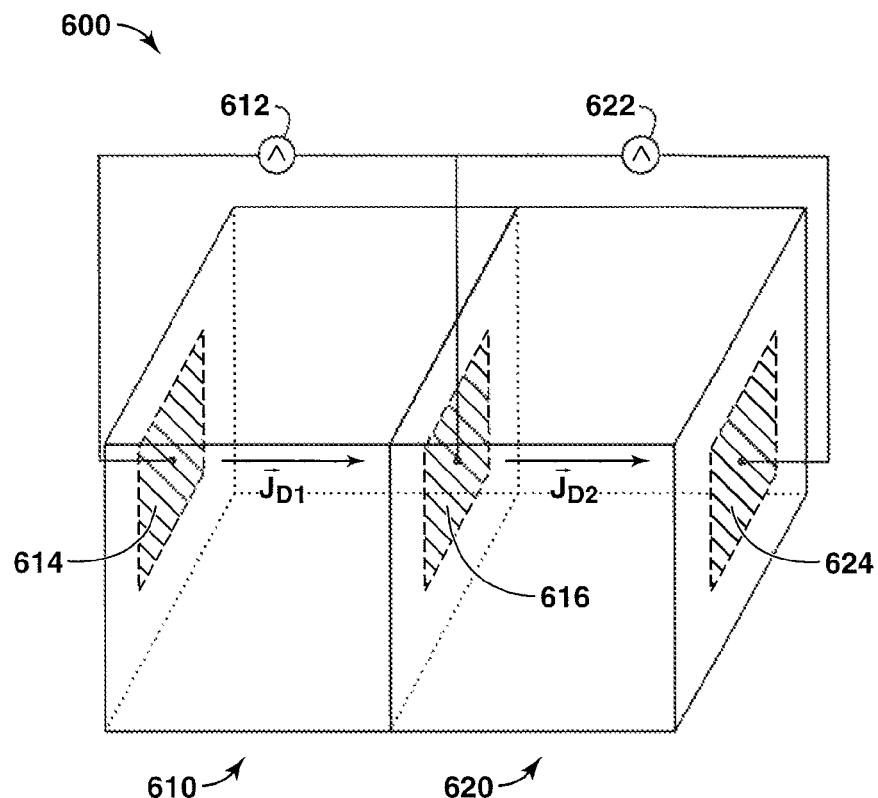
FIG. 6 is a diagram illustrating a transducer configured to measure gradients in multiple locations according to an embodiment of the present techniques.

FIG. 6 is a diagram illustrating a transducer configured to measure gradients in multiple locations according to an embodiment of the present techniques. This configuration could be used to measure the second derivative of the measured property (i.e. the gradient of the gradient). The configuration or arrangement 600 of the transducer includes a gradient material 610 and a measuring device 612 for measuring either $i_D$ or V of the material 610. The arrangement 600 also includes a gradient transducer 620 and a measuring device 622 for measuring either $i_D$ or V of the transducer 620. The transducer 610 has an electrode 614 and an electrode 616 coupled to the measuring device 612. The electrode 616 is shared by the transducer 620. The transducer 620 has an electrode 624 as well as the electrode 616 coupled to the measuring device 622. Alternatively, the transducers could be separated such that each transducer is aligned substantially parallel to other transducers in the arrangement, but each transducer has two separate electrodes. The transducer 610 and the transducer 620 may be gradient transducers as disclosed in embodiments of the present techniques or alternative configurations.

Figure 7:
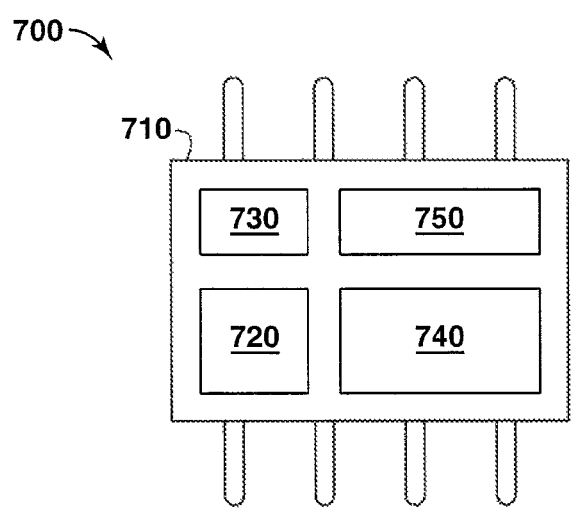
FIG. 7 is a diagram illustrating an integrated circuit containing a gradient transducer according to an embodiment of the present techniques.

FIG. 7 is a diagram illustrating an integrated circuit containing a gradient transducer according to an embodiment of the present techniques. An integrated circuit 700 includes package 710. The package 710 includes an arrangement of gradient transducers 720. Also included in package 710 is an amplifier 730. The amplifier 730 increases the magnitude of signal received from the gradient transducers 720. Also included in package 710 is a memory 740. The memory 740 may be a temporary buffer for measurement values or a permanent storage location for measurement values. Also included in package 710 is a microprocessor 750. The microprocessor 750 may be used to analyze measurement values stored in the memory 740 and control the gradient transducers 720, the amplifier 730, and the memory 740. These devices may be constructed on a single substrate using methods known to those skilled in the art.

The arrangements shown in FIG. 4, FIG. 5, and FIG. 6 are not intended to be exclusive arrangements. One skilled in the art will recognize that additional arrangements could be derived from known circuit design methods. For example, two or more electrode pairs may be disposed on a material to provide measurements relative to a material according to the present techniques above. These electrode pairs may be oriented in different directions relative to each other at different angles to provide information on the gradients for specific directions. That is, the two, three or four or more electrode pairs may be oriented on a material to provide different gradients along different axis.

Although a transducer material size of 1 cm×1 cm×1 cm is used to demonstrate the calculations for device operation, this size is not required for operation of the gradient transducer. The size of the transducer material affects the wavelengths that may be measured. Wavelengths for marine seismology are approximately within the range of 10 meters to 1000 meters. Generally, the dimension of the transducer in the direction of the gradient should be much smaller than the wavelength. Smaller transducers can measure smaller wavelengths, while larger transducers yield more signal. High frequency signals associated with smaller wavelengths experience greater attenuation in the ocean. Therefore, the frequencies may be selected based on the measurement desired. One advantageous embodiment of the transducer is shown above as a cube with dimensions of 1 cm×1 cm×1 cm.

Although a cube has been employed for the examples above, the shape of the gradient transducers does not limit the functionality of the transducer. For instance, a further advantageous embodiment of the transducer is one having unequal sides. That is, one dimension may be small to measure small wavelengths while the other two dimensions are large such that the cross-sectional area of the electrodes is large which increases the total current flow in equation (5). Further, other shapes may also be employed in alternative embodiments including cylinders or spheres. One skilled in the art would be capable of adapting the previously employed equations to correlate pressure gradient with electrical properties of the transducer.

A transducer characteristic describes the relationship between the output of a transducer and the desired property to be measured by the transducer. When the ratio of the transducer output to the measured property is a constant, that ratio provides the transducer characteristic and is referred to as the transduction constant. For example, the transduction constant determined from equation (13) is $-1.77 \times 10^{-10}$ amperes per pascal per meter; and the transduction constant determined from equation (19) is $6.62 \times 10^{-13}$ volts per pascal per meter. In these cases, the transducer characteristic was determined from known properties of the transducer material. However, other means may be employed to determine the transducer characteristic; for example, by a process of calibration. By this process, a transducer may be subjected to a known condition, such as a known pressure gradient, then its electrical response measured. The process may be repeated for many values of known, or controlled pressure gradients thereby empirically determining the relationship between the transducer's output and the pressure gradient. In like manner, the transducer characteristics may be determined empirically for measurement of gradients of temperature, strain, and other properties that affect the energy gap.

As may be appreciated, the transducers in the above embodiments may be utilized in various different systems. For instance, the output of the transducer may include recording the output indicative of the gradient and storing in memory, displaying the output indicative of the gradient, and providing the output indicative of the gradient as an input to other circuitry, including feedback control circuitry. The transducer may be used as part of a sensor or receiver in seismic applications, underwater acoustics applications, fluid flow applications, heat flow applications, medical diagnostic and imaging applications, and others.

Figure 8:
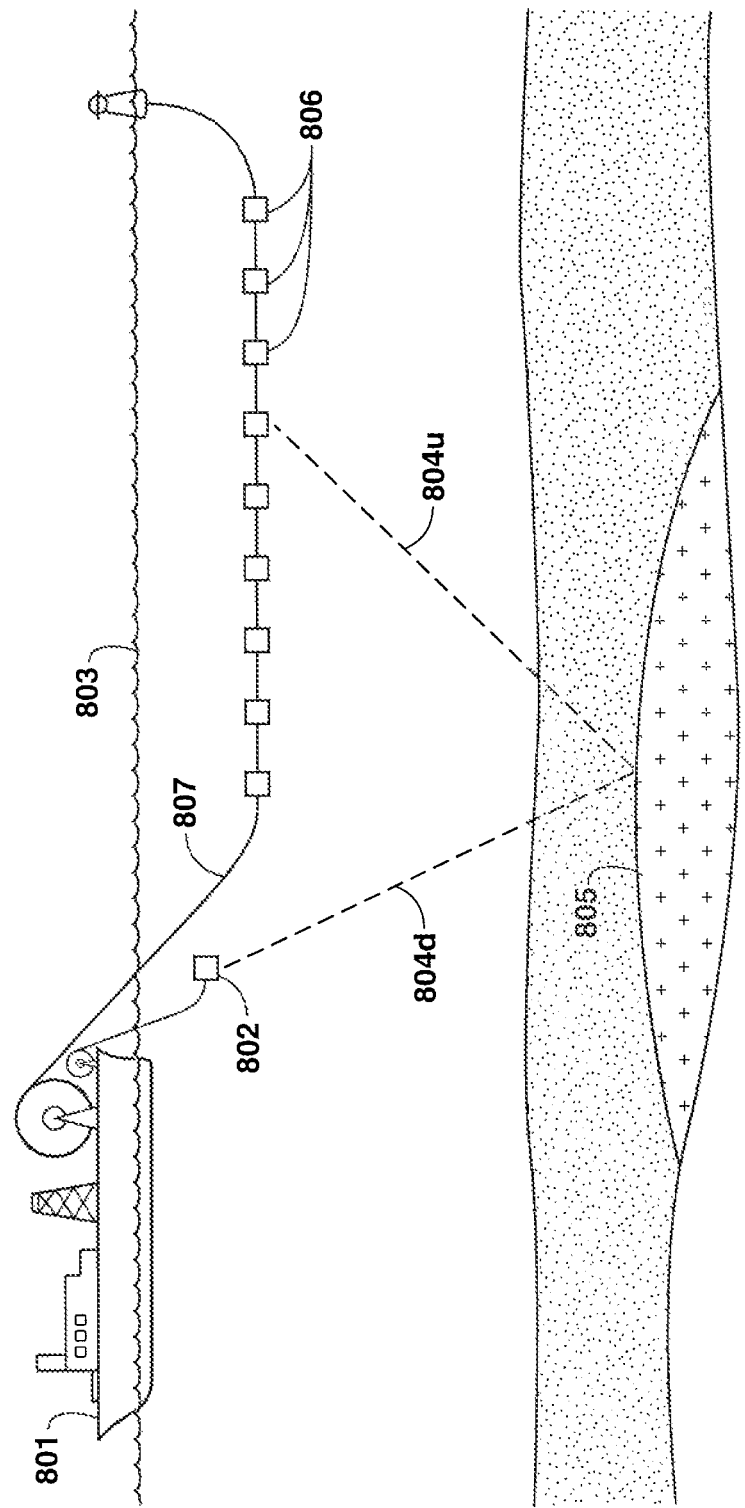
FIG. 8 shows a schematic according to an embodiment of an ocean streamer cable marine seismic acquisition system.
Figure 9:
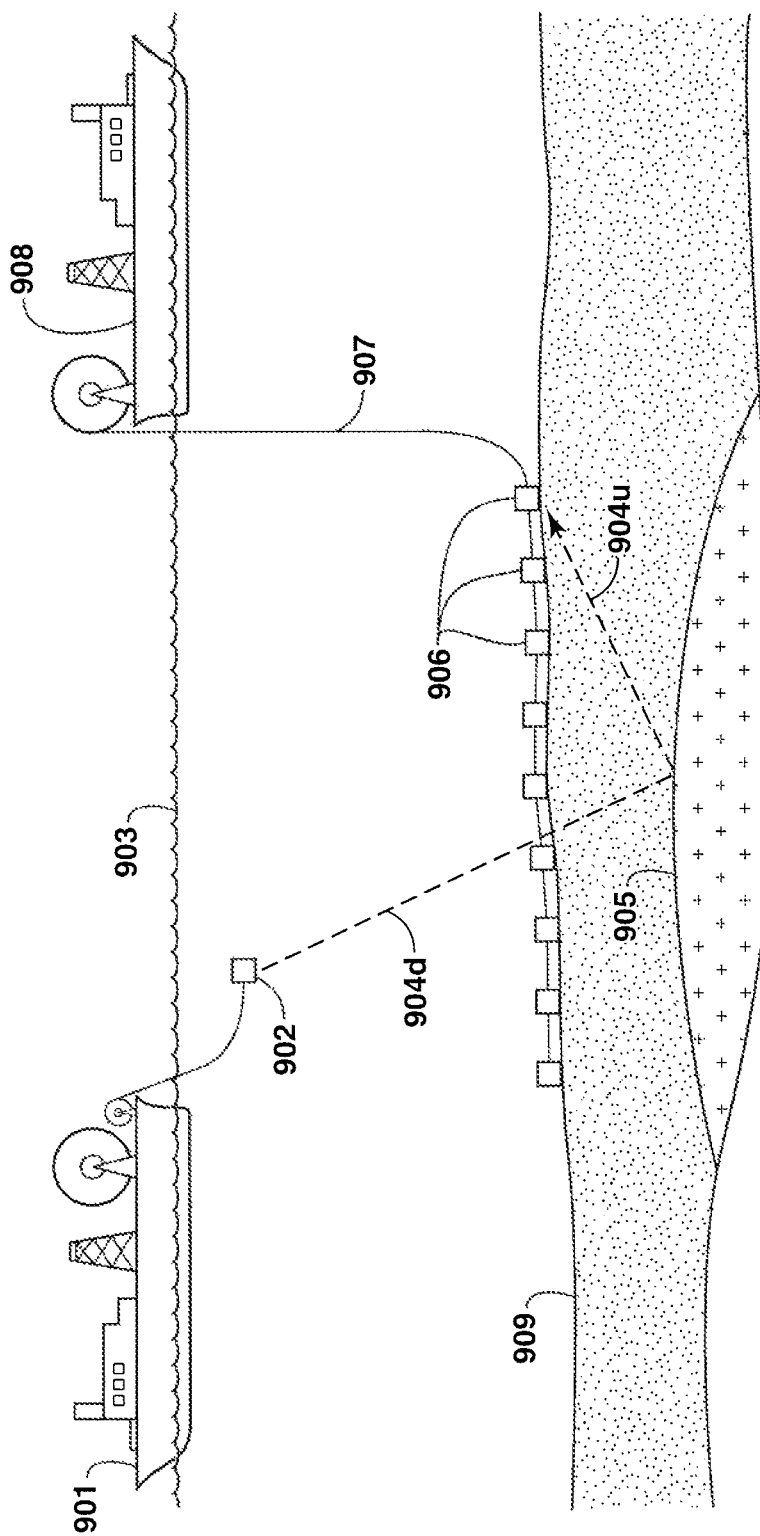
FIG. 9 shows a schematic according to an embodiment of an ocean bottom cable marine seismic acquisition system of the present techniques.

As an exemplary embodiment of possible use of the gradient transducer, FIGS. 8 and 9 are exemplary systems involving marine seismic surveying. In FIG. 8, a ship 801 tows a seismic source 802 several meters below the surface 803 of the ocean. The seismic source 802 is activated to produce a down-going seismic wave 804$d$ that is at least partially reflected by a subsea interface or boundary 805 below the surface of the seafloor. The up-going reflected seismic wave 804$u$ then travels toward a platform, cable, or streamer 807 that has one or more receivers 806 including the pressure gradient transducers attached thereto. Although not shown, the streamer 807 may include an array of streamers having receivers with pressure gradient transducers attached thereto. The sensors or receivers 806 may include only the pressure gradient transducers or may also include other measuring devices such as one or more hydrophones or one or more geophones. The receivers 806 may be separate stations having internal memory or may be connected to a recording system typically on a vessel for receiving output of the measuring devices transmitted to the vessel. Each of the pressure gradient transducers in the receivers is passively responsive to a pressure gradient in the water in which the gradient transducers are disposed. Each pressure gradient transducer is adapted to produce an output indicative of the pressure gradient. Although not shown in FIG. 8, the streamer 807 may also include hydrophones to provide a measurement of pressure. If a seismic wave is recorded by a pressure gradient transducer and a hydrophone, then a separation of up-going and down-going waves can be determined.

Hydrophones and geophones disposed at the seafloor are typically used in pairs when collecting seismic data. However, pressure gradient transducers, unlike geophones, can measure seismic data anywhere in the water column. The present techniques apply to pressure gradient transducers positioned anywhere in the water column including the seafloor or surface.

FIG. 9 is an alternative exemplary embodiment of a marine seismic surveying with the gradient transducer. In FIG. 9, a first ship 901 tows a seismic source 902 several meters below the surface 903 of the ocean. The seismic source 902 is activated to produce a down-going seismic wave 904$d$ that is at least partially reflected by a subsea interface or boundary 905 below the surface of the seafloor. The up-going reflected seismic wave 904$u$ then travels toward a platform, cable array, or cable 907 attached to a second ship 908 that has one or more receivers 906 including the pressure gradient transducers attached thereto.

In one type of marine seismic surveying, the receivers 906 having the pressure gradient transducers are located at regular intervals along the cable 907, which may be one or more ocean bottom cables that are arranged on the seafloor 909. Similar to the receivers 806, these receivers 906 may include only the pressure gradient transducers or may also include other measuring devices, such as one or more hydrophones or one or more geophones. The receivers 906 may be separate stations having internal memory or may be connected to a recording system typically on a vessel for receiving output of the measuring devices transmitted to the vessel. Although not shown in FIG. 9, cable 907 may also include hydrophones, and may also include geophones. When necessary, the second ship 908 is used to move the cable 907 to a new position on the seafloor 909. Several miles of cable 907 are typically deployed along the seafloor 909, and several cables are typically deployed in parallel arrangements. Cable 907 arrangements are particularly well suited for use in certain zones (such as zones cluttered with platforms or where the water is very shallow) and where the use of ship-towed hydrophone arrays (which are located proximate the ocean surface 903 and are typically referred to as "streamers") are not practical.

One advantageous embodiment for the present techniques couples the gradient transducer to an amplification circuit, pre-amp, or filter for the purpose of increasing the magnitude and/or the quality of the signal from the transducer. Another advantageous embodiment for the present techniques couples the transducer material and measuring device to memory circuitry for storing measurements and a microprocessor for analyzing the measurements. The gradient transducer, pre-amp, filter, measuring device, memory, and/or microprocessor may be packaged into a single integrated circuit. This integrated circuit could be fabricated using semiconductor processes knowledgeable to one skilled in the art.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present techniques, processes, machines, manufacture, compositions of matter, means, methods, or steps, presently existing or later to be developed that perform substantially the same function or achieve substantially the same result as the corresponding embodiments described herein may be utilized according to the present techniques. Accordingly, the appended claims are intended to include within their scope such processes, machines, manufacture, compositions of matter, means, methods, or steps and their equivalents.

The invention claimed is:

1. A gradient-sensing transducer comprising:
   a transducer material passively responsive to a gradient of a property of a medium in which a portion of the transducer is disposed; wherein the transducer material has an energy gap in its charge carrier energy states which energy gap is sensitive to the property, and a gradient in the property creates a corresponding gradient in the energy gap, which in turn creates a gradient in concentration of free charge carriers including electrons and holes, resulting in a diffusion flow of the free charge carriers from regions of higher concentrations to regions of lower concentrations, whereby a net electric diffusion current results due to a difference in mobilities of free charge carriers of opposite electrical charge;
   a pair of electrodes coupled to the transducer material;
   no applied or external magnetic field source having a vector field component perpendicular to a line connecting the pair of electrodes; and
   a measuring device electrically coupled to the pair of electrodes, wherein the measuring device is adapted to produce an output indicative of the gradient based on diffusion current density, or voltage associated with the diffusion current density, between the pair of electrodes in the transducer material.

2. The transducer of claim 1, wherein the measuring device is a current measurement device that provides the output indicative of the gradient as a function of current measured between the pair of electrodes.

3. The transducer of claim 1, wherein the measuring device is a voltage measurement device that provides the output indicative of the gradient as a function of voltage measured between the pair of electrodes.

4. The transducer of claim 1, wherein the measuring device is a diffusion current density measurement device that provides output indicative of the gradient.

5. The transducer of claim 1, wherein the transducer material is a semiconductor.

6. The transducer of claim 5, wherein the semiconductor is an intrinsic semiconductor or a doped semiconductor.

7. The transducer of claim 1, wherein the transducer material is comprised of indium antimonide.

8. The transducer of claim 1 further comprising a waterproof and electrically insulating package enclosing the transducer material and the plurality of electrodes.

9. The transducer of claim 1, wherein a portion of the transducer is part of an integrated circuit.

10. The transducer of claim 9, further comprising an amplifier circuit adapted to increase a magnitude of a signal between at least two of the plurality of electrodes.

11. The transducer of claim 9, further comprising a filter adapted to increase the quality of a signal between at least two of the plurality of electrodes.

12. The transducer of claim 1 wherein the property of the medium is one of pressure and temperature.

13. The transducer of claim 1 wherein the pair of electrodes comprises two electrodes disposed on opposite sides of the transducer material along a first direction.

14. The transducer of claim 1 wherein the pair of electrodes comprises:
   a first pair of electrodes disposed on opposite sides of the material along a first direction;
   and further comprising:
   a second pair of electrodes disposed on opposite sides of the material along a second direction, wherein the second direction is different from the first direction; and
   a third pair of electrodes disposed on opposite sides of the material along a third direction, wherein the third direction is different from the first direction and the second direction; and
   measuring devices electrically coupled to the second and third pairs of electrodes.

15. The transducer of claim 1 wherein the measuring device detects modifications of the diffusion current density in the transducer material that result from changes in the energy gap.

16. The transducer of claim 1, wherein the transducer material substantially comprises a solid having:
   an energy gap, being an energy range where no electron states exist, wherein the energy gap is sensitive to the medium property;
   electrons and holes as its free charge carriers;
   electron mobility $\mu_e$ different from hole mobility $\mu_h$.

17. The transducer of claim 16, wherein the transducer material is selected to maximize the difference $\mu_e - \mu_h$ in electron and hole mobilities.

18. A method for sensing a gradient in a medium comprising:
   disposing a gradient transducer in a medium, said gradient transducer being capable of making a single-transducer measurement of a local gradient; wherein the transducer is made of a material that has an energy gap in its charge carrier energy states which energy gap is sensitive to the property, and a gradient in the property creates a corresponding gradient in the energy gap, which in turn creates a gradient in concentration of free charge carriers including electrons and holes, resulting in a diffusion flow of the free charge carriers from regions of higher concentrations to regions of lower concentrations, whereby a net electric diffusion current results due to a difference in mobilities of free charge carriers of opposite electrical charge, wherein no external magnetic field is applied to the gradient transducer;
   measuring a diffusion current density, or a voltage associated with the diffusion current density, in the transducer; and
   associating the measured diffusion current density or voltage with a pressure gradient, or a temperature gradient, or a gradient of another physical property in the medium.

19. The method of claim 18, wherein disposing the gradient transducer in the medium comprises disposing at least three gradient transducers in the medium, wherein each of the at least three transducers provide output indicative of a gradient along different directions.

20. The method of claim 18, further comprising one of recording the measured diffusion current density or voltage, displaying measured diffusion current density or voltage, and providing the measured diffusion current density or voltage as an input to other circuitry.

21. A system for marine seismic survey comprising:
a vessel;
a submerged towable platform adapted to be towed by the vessel under water and over a submerged area to be surveyed;
at least one receiver operably coupled to the submerged towable platform, the at least one receiver having a gradient transducer, wherein the gradient transducer produces an output, absent an applied or external magnetic field, indicative of a gradient of a property of a medium in which the gradient transducer is disposed, based on a diffusion current density within the gradient transducer;
wherein the gradient transducer is made of a material that has an energy gap in its charge carrier energy states which energy gap is sensitive to the property, and a gradient in the property creates a corresponding gradient in the energy gap, which in turn creates a gradient in concentration of free charge carriers including electrons and holes, resulting in a diffusion flow of the free charge carriers from regions of higher concentrations to regions of lower concentrations, whereby a net electric diffusion current results due to a difference in mobilities of free charge carriers of opposite electrical charge; and
wherein the gradient transducer includes at least one pair of electrodes to collect the diffusion current and a measuring device electrically coupled to the at least one pair of electrodes, wherein the measuring device is adapted to produce an output indicative of the gradient based on the diffusion current density, or voltage associated with the diffusion current, between the at least one pair of electrodes in the gradient transducer.

22. The system of claim 21, wherein the at least one receiver further comprises at least one hydrophone.

23. The system of claim 21, wherein the receiver has a memory for storing the output from the gradient transducer.

* * * * *